(12) United States Patent
George et al.

(10) Patent No.: US 11,585,450 B2
(45) Date of Patent: Feb. 21, 2023

(54) BAR VALVE

(71) Applicant: Kohler Mira Limited, Gloucestershire (GB)

(72) Inventors: Joshua George, Cheltenham (GB); Leyton James Iddon, Cheltenham (GB)

(73) Assignee: KOHLER MIRA LIMITED, Gloucestershire (GB)

( * ) Notice: Subject to any disclaimer, the term of this patent is extended or adjusted under 35 U.S.C. 154(b) by 247 days.

(21) Appl. No.: 17/008,033

(22) Filed: Aug. 31, 2020

(65) Prior Publication Data

US 2020/0393858 A1    Dec. 17, 2020

Related U.S. Application Data

(63) Continuation of application No. PCT/GB2019/050536, filed on Feb. 27, 2019.

(30) Foreign Application Priority Data

Mar. 1, 2018  (GB) ...................................... 1803362

(51) Int. Cl.
*F16K 11/074*    (2006.01)
*F16K 31/00*    (2006.01)
(Continued)

(52) U.S. Cl.
CPC ........ *F16K 11/074* (2013.01); *F16K 11/0743* (2013.01); *F16K 19/006* (2013.01); *F16K 31/002* (2013.01); *G05D 23/134* (2013.01)

(58) Field of Classification Search
CPC ............. G05D 23/1353; F16K 11/0743; F16K 11/074; F16K 27/045; F16K 19/006;
(Continued)

(56) References Cited

U.S. PATENT DOCUMENTS 3,762,638 A * 10/1973 Goldsmith .............. F16K 11/02
236/12.2
4,304,358 A    12/1981 Riis
(Continued)

FOREIGN PATENT DOCUMENTS

DE    102010018671 A1 * 11/2011    ........... E03C 1/0408
DE    102014116399 A1 *  5/2015    .............. F16K 11/04
(Continued)

OTHER PUBLICATIONS

Examination Report for GB Appl. Ser. No. 1803362.1 dated Jan. 6, 2020 (2 pages).
(Continued)

*Primary Examiner* — David Colon-Morales
(74) *Attorney, Agent, or Firm* — Husch Blackwell LLP (57) ABSTRACT

A bar valve includes an elongate housing having a first inlet located towards a first end of the housing, a second inlet located towards a second end of the housing, and an outlet located between the first inlet and the second inlet. A mixing chamber is located within the housing, the mixing chamber being configured to receive first and second input flows from the first inlet and second inlet, respectively. A flow controller is configured to receive a mixed flow from the mixing chamber and controllably output an outlet flow to the outlet. The mixing chamber and flow controller is disposed sequentially in a region of the housing between the first end and the outlet, thereby confining the mixed flow and the outlet flow to the region of the housing between the first end and the outlet.

19 Claims, 6 Drawing Sheets

(51) Int. Cl.
*G05D 23/13* (2006.01)
*F16K 11/00* (2006.01)

(58) Field of Classification Search
CPC .................. F16K 19/00; F16K 31/002; Y10T 137/86863; E03C 2201/30; E03C 1/0408; E03C 1/04
See application file for complete search history.

(56) References Cited

U.S. PATENT DOCUMENTS

| | | | | |
|---|---|---|---|---|
| 4,349,149 | A | * 9/1982 | Humpert | ............... F16K 11/207 |
| | | | | 137/100 |
| 4,669,653 | A | * 6/1987 | Avelov | ............... G05D 23/1353 |
| | | | | 236/12.13 |
| 5,203,496 | A | 4/1993 | Kline | |
| 5,433,378 | A | 7/1995 | Orlandi | |
| 5,511,723 | A | * 4/1996 | Eki | ................... G05D 23/1393 |
| | | | | 236/12.12 |
| 5,743,463 | A | * 4/1998 | Ueno | ................. G05D 23/1346 |
| | | | | 236/12.2 |
| 9,903,103 | B2 | * 2/2018 | Ho | ............................ E03C 1/04 |
| 2003/0101510 | A1 | 6/2003 | Ottelli | |
| 2008/0164330 | A1 | 7/2008 | Wei et al. | |
| 2014/0102574 | A1 | * 4/2014 | Wang | ................... F16K 11/074 |
| | | | | 4/675 |
| 2015/0220090 | A1 | 8/2015 | Ottelli | |
| 2020/0341497 | A1 | * 10/2020 | Mace | ..................... F16K 19/00 |

FOREIGN PATENT DOCUMENTS

| | | | | |
|---|---|---|---|---|
| EP | 0 624 836 | A1 | 11/1994 | |
| EP | 0 647 808 | A1 | 4/1995 | |
| EP | 0 801 255 | A2 | 10/1997 | |
| EP | 2 423 775 | | 2/2012 | |
| EP | 2 789 885 | | 10/2014 | |
| EP | 2789885 | A1 * | 10/2014 | ........... F16K 19/006 |
| EP | 2 940 220 | A1 | 11/2015 | |
| EP | 2 977 657 | | 1/2016 | |
| EP | 2977657 | A1 * | 1/2016 | ........... F16K 19/006 |
| EP | 2 988 039 | | 2/2016 | |
| EP | 2988039 | A1 * | 2/2016 | ........... F16K 19/006 |
| EP | 3470953 | A1 * | 4/2019 | .......... F16K 11/0853 |
| GB | 2 234 327 | A | 1/1991 | |
| WO | WO-2006054320 | A1 * | 5/2006 | ........... F16K 11/074 |
| WO | WO-2011134628 | A1 * | 11/2011 | ........... E03C 1/0408 |

OTHER PUBLICATIONS

International Preliminary Report on Patentability for PCT Appl. Ser. No. PCT/GB2019/050536 dated Sep. 10, 2020 (9 pages).
International Search Report and Written Opinion for PCT Appl. Ser. No. PCT/GB2019/050536 dated May 20, 2019 (11 pages).
Search Report for GB Appl. Ser. No. GB18033621 dated Aug. 13, 2018 (4 Pages).
Examination Report dated Jan. 6, 2020 2 pages.
International Search Report dated May 20, 2019 3 pages.
Search Report on GB18033621 dated Aug. 12, 2018 4 Pages.

* cited by examiner

BAR VALVE

CROSS-REFERENCE TO RELATED PATENT APPLICATIONS

This application is a Continuation of International Application No. PCT/GB2019/050536, filed Feb. 27, 2019, which claims the benefit of and priority to United Kingdom Priority Patent Application No. GB 1803362.1, filed Mar. 1, 2018. The entire disclosures of International Application No. PCT/GB2019/050536 and United Kingdom Priority Patent Application No. GB 1803362.1, including their specifications, drawings, claims and abstracts, are incorporated herein by reference.

BACKGROUND

The present disclosure relates to bar valves and to mixing taps and shower assemblies comprising bar valves.

Mixing taps are known in the art for the mixing of two input flows of water into a single output flow. Commonly, a hot input flow and a cold input flow are combined together in order to provide an output flow at a third temperature between the temperatures of the hot and cold input flows. A single output flow or multiple output flows may be provided. Where multiple output flows are provided, these may be activated together or separately, dependent on the needs of the user.

Mixing taps may comprise bar valves. A bar valve typically comprises an elongate housing with an input flow provided towards each end of the housing. The input flows are then combined in a mixing chamber before forming an outlet flow and exiting the bar valve towards the center of the housing. In general, a flow control and a temperature control are located at opposing ends of the housing and controllable by a user.

It is desired to provide a bar valve with improved flow characteristics.

SUMMARY

An exemplary embodiment relates to a bar valve that includes an elongate housing having a first inlet located towards a first end of the housing, a second inlet located towards a second end of the housing, and an outlet located between the first inlet and the second inlet. A mixing chamber is located within the housing, the mixing chamber being configured to receive first and second input flows from the first inlet and second inlet, respectively. A flow controller is configured to receive a mixed flow from the mixing chamber and controllably output an outlet flow to the outlet. The mixing chamber and flow controller is disposed sequentially in a region of the housing between the first end and the outlet, thereby confining the mixed flow and the outlet flow to the region of the housing between the first end and the outlet.

Another exemplary embodiment relates to a shower assembly that includes a shower head and a bar valve. The bar valve includes an elongate housing having a first inlet located towards a first end of the housing, a second inlet located towards a second end of the housing, and an outlet located between the first inlet and the second inlet. A mixing chamber is provided within the housing, the mixing chamber being configured to receive first and second input flows from the first inlet and second inlet, respectively. A flow controller is configured to receive a mixed flow from the mixing chamber and controllably output an outlet flow to the outlet. The mixing chamber and flow controller are disposed sequentially in a region of the housing between the first end and the outlet, thereby confining the mixed flow and the outlet flow to the region of the housing between the first end and the outlet. The shower head connected to an outlet of the bar valve.

Another exemplary embodiment relates to a mixing tap that includes a bar valve. The bar valve includes an elongate housing having a first inlet located towards a first end of the housing, a second inlet located towards a second end of the housing, and an outlet located between the first inlet and the second inlet. A mixing chamber is located within the housing, the mixing chamber being configured to receive first and second input flows from the first inlet and second inlet, respectively. A flow controller is configured to receive a mixed flow from the mixing chamber and controllably output an outlet flow to the outlet. The mixing chamber and flow controller is disposed sequentially in a region of the housing between the first end and the outlet, thereby confining the mixed flow and the outlet flow to the region of the housing between the first end and the outlet.

BRIEF DESCRIPTION OF THE DRAWINGS

A non-limiting embodiment of the present disclosure will now be described with reference to the accompanying drawings, in which.

DETAILED DESCRIPTION

According to a first aspect, there is provided a bar valve comprising: an elongate housing having a first inlet located towards a first end of the housing, a second inlet located towards a second end of the housing, and an outlet located between the first inlet and the second inlet; a mixing chamber within the housing, the mixing chamber being configured to receive first and second input flows from the first inlet and second inlet, respectively; and a flow controller configured to receive a mixed flow from the mixing chamber and controllably output an outlet flow to the outlet; the mixing chamber and flow controller being disposed sequentially in a region of the housing between the first end and the outlet, thereby confining, the mixed flow and the outlet flow to the region of the housing between the first end and the outlet.

The mixed flow and outlet flow are not restricted by large changes in their direction of flow. In known arrangements, where the mixing chamber and flow controller are located either side of the outlet, e.g. at opposing ends of the housing, at least one of the mixed flow and outlet flow is required to negotiate a 180° bend between the mixing chamber and the flow controller. When such bends are introduced pressure can be lost in the flow. However, a bar valve of the present disclosure may not suffer from such pressure loss or may not suffer from as great a pressure loss, due to the positioning of the mixing chamber and flow controller relative to the outlet and housing, i.e. being disposed sequentially along the longitudinal axis of the housing in the region of the housing between the first end and the outlet. Thus, improved flow may be achieved.

As water can flow directly from the mixing chamber to the outlet without any significant change in direction—i.e. by avoiding any 180° changes in direction, and/or any change greater than 90°—pressure losses can be avoided, reduced or minimized.

The mixing chamber and the flow controller may be disposed sequentially along a longitudinal axis of the housing.

The mixing chamber may be located at or adjacent to the first end of the housing, the flow controller being located adjacent to the mixing chamber.

The mixed flow entering the flow controller and the outlet flow exiting the flow controller may be parallel to the or a longitudinal axis of the housing. By diverting the flow the minimum amount possible, any pressure losses can be minimized.

The bar valve may further comprise a temperature controller for varying the temperature of the mixed flow. The temperature controller may vary the ratio of the first and second inlet flows to the mixing chamber. The temperature controller may be thermostatic.

The bar valve may further comprise a temperature control actuator for controlling the temperature controller. The temperature control actuator may include a temperature control knob, handle, lever or button. The temperature control actuator may be located at the first end of the housing.

The bar valve may further comprise a flow control actuator for controlling the flow controller. The flow control actuator may include a flow control knob, handle, lever or button. The flow control actuator may be located at the second end of the housing.

The flow controller may be rotatably mounted about the longitudinal axis of the housing.

The flow controller may comprise a shell including at least one shell aperture and a rotatable element including at least one flow aperture, the rotatable element being actuatable by a user to selectively align the flow aperture with the shell aperture, varying flow through the flow controller.

Rotation of the rotatable element will result in a varying degree of overlap of the shell aperture and flow aperture. Thus, the amount of flow through the flow controller may vary. The flow may be zero when the flow aperture and shell aperture are not aligned at all and may be a maximum when they are fully aligned.

The flow controller may further include a shaft, the shaft being rotatable to cause rotation of the rotatable element. The shaft may be keyed into the rotatable element and may be rotatable by the valve flow actuator, particularly by rotation of the flow control knob.

The flow controller may further comprise a fixed element, the rotatable element bearing against the fixed element, during rotation. The fixed element may therefore include apertures that align with those of the shell, the fixed element being rotationally-fixed relative to the shell.

The flow controller may further comprise a seal element interposed between the fixed element and the shell. The seal element may therefore include apertures that align with those of the shell and the fixed element, the seal element being rotationally-fixed relative to the shell.

The flow controller may further comprise a flow cap for sealing together the rotatable element and the shell. The shell may extend such that it overlaps the circumferences of the seal element, fixed element, and rotatable element, the flow cap then providing a seal between the end of the shell and an outward face of the rotatable element. This may prevent or limit leakage through the shell and around the fixed element and rotatable element.

The flow cap, rotatable element, fixed element, seal element, and shell may be arranged sequentially in a direction of flow through the flow controller.

The bar valve may further comprise an additional outlet through which the flow controller can direct flow. One or more additional outlets may be provided. In embodiments, the bar valve may comprise up to 10 outlets. For instance, the bar valve may comprise two, three, four, five, six, seven, eight, nine or 10 outlets. Where additional outlets are present, additional apertures may be found through the shell, seal element and fixed element of the flow controller in order that the rotatable element can be rotated to direct flow to any of the outlets. The aperture in the rotatable element may be configured such that it can direct flow to multiple outlets at the same time.

There may be two outlets, the shell, fixed element, and seal element including two apertures, the rotatable element being rotated to select between sending flow through one of the apertures to one outlet, through the other aperture to the other outlet, or through both apertures to both outlets. The rotatable element may also be rotated to prevent flow through the flow controller.

According to a second aspect, there is provided a shower assembly comprising a shower head connected to an outlet of a bar valve according to the first aspect.

According to a third aspect, there is provided a mixing tap comprising a bar valve according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Figure 1:
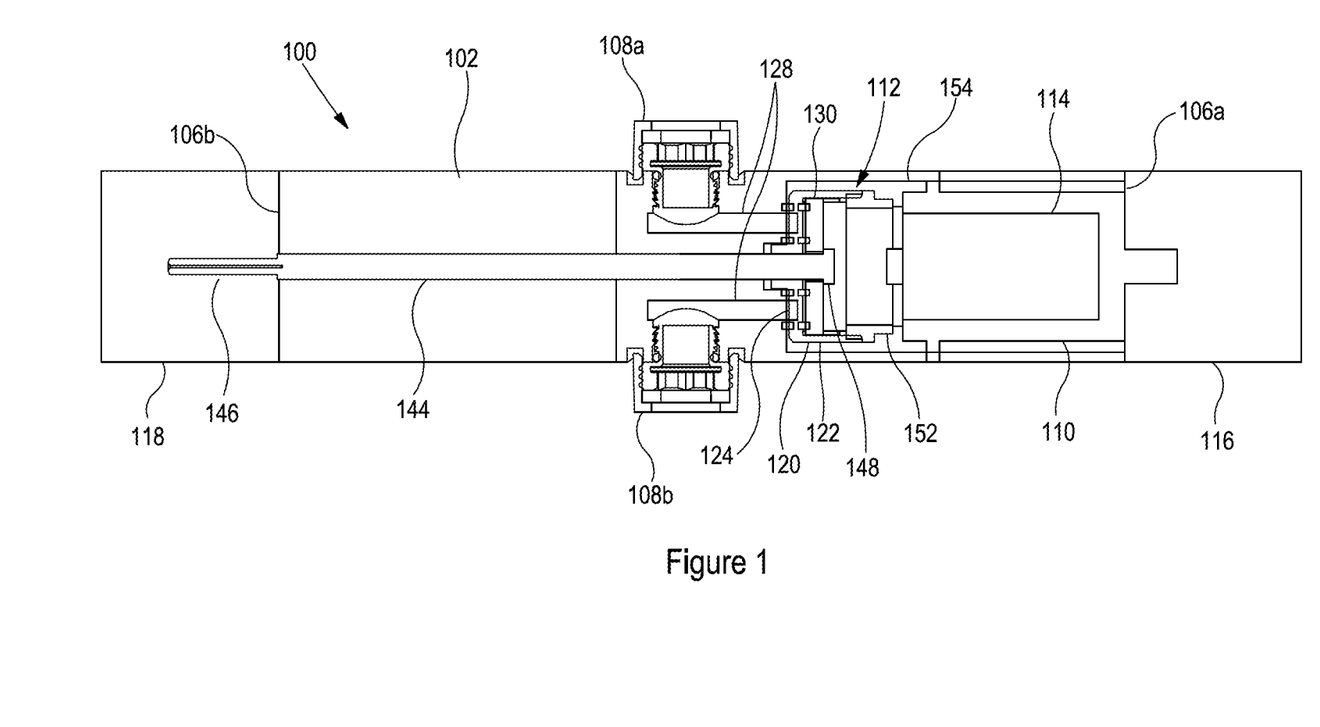
FIG. 1 is a cross-sectional view from a first angle of a bar valve in accordance with the invention.
Figure 2:
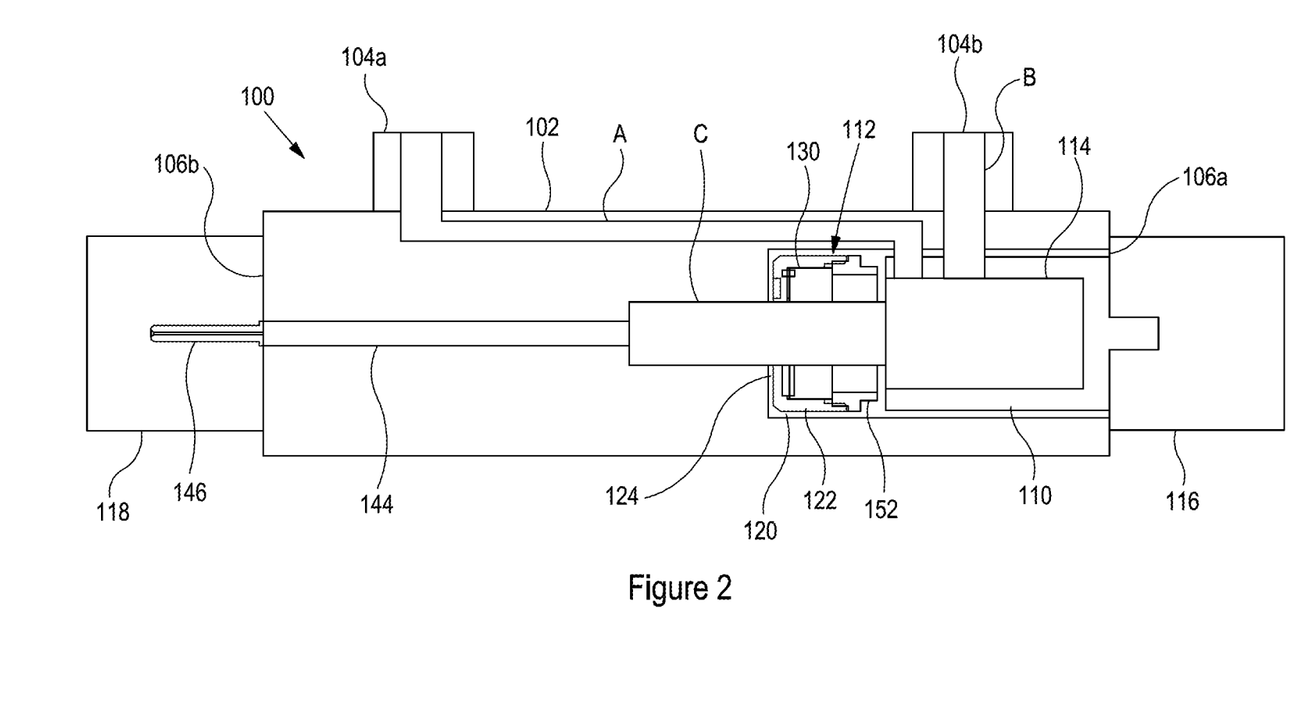
FIG. 2 is a cross-sectional view from a second angle of the bar valve of FIG. 1.

Referring firstly to FIGS. 1 and 2, there is shown an embodiment of a bar valve 100. FIG. 1 shows the bar valve 100 from a first angle, typically a front-on view of the bar valve 100 when installed for example in a bathroom. FIG. 2 shows the bar valve 100 from a second angle that is 90 degrees offset from the first angle, typically a top-down view of the bar valve 100 when installed for example in a bathroom. FIG. 2 depicts the flows of water within the bar valve including hot water flow A, cold water flow B, and mixed water flow C.

The bar valve 100 comprises an elongate housing 102 with two inlets 104a, 104b: a hot inlet 104a for the delivery of hot water into the bar valve 100 and a cold inlet 104b for the delivery of cold water. The cold inlet 104b is disposed towards a first end 106a of the housing 102 and the hot inlet 104a is disposed towards a second end 106b of the housing 102, the first and second ends 106a, 106b opposing each other along a longitudinal axis of the housing 102.

Also included in the housing 102 are two outlets 108a, 108b. The two outlets 108a, 108b each enable a flow of water to exit the housing 102. An upper outlet 108a allows water to exit upwards out of the bar valve 100, typically to a fixed showerhead, and a lower outlet 108b allows water to exit downwards out of the bar valve 100, typically to a movable showerhead, e.g. a handshower. The outlets 108a, 108b may emit water to any type of attachment, such as a tap, showerhead, or other water emission device. As is required in conventional bar valves 100, the outlets 108a, 108b are centrally-located on the housing 102. In an embodiment, the upper outlet 108a may be connected to a showerhead, e.g. a fixed showerhead or a movable showerhead such as a handshower, and the lower outlet 108b may emit water to a tap arranged and operable to dispense water into a bathtub.

A temperature controller 110 and flow controller 112 are sequentially disposed between, and are configured to manage the flow of water between, the inlets 104a, 104b and outlets 108a, 108b. The temperature controller 110 controls the input of water from the hot inlet 104a and the cold inlet 104b to a mixing chamber 114 in order to alter the ratio of hot and cold water. Thus, the temperature of the mixed flow exiting the mixing chamber 114 to the flow controller 112 can be altered. The temperature of the water in the mixing chamber 114 can be changed according to a user input via a control actuator in the form of a temperature control knob 116 situated at the first end 106a of the housing 102. In the depicted embodiment, the mixing chamber 114 is formed within the temperature controller 110, but in other embodiments it may be formed separately.

In the present embodiment, the temperature controller 110 is a thermostatic temperature controller that automatically reacts to the temperature of the water within the mixing chamber 114 to vary the inputs from the hot inlet 104a and cold inlet 104b. The temperature control knob 116 can therefore be set to a user-desired temperature, the thermostatic temperature controller 110 automatically adjusting the water input such that the temperature of the water in the mixing chamber 114 is maintained at the user-desired temperature. The workings of a thermostatic temperature controller will be known to the skilled person and are not the subject of the present disclosure, and therefore further detailed description is omitted, for brevity.

After exiting the mixing chamber 114, the mixed flow passes through the flow controller 112, which acts to control the output of the water through the outlets 108a, 108b. By varying the size of the aperture through which the water must pass, the flow of water can be varied between zero flow where the aperture is closed to a maximum flow where the aperture is at its maximum size. Furthermore, in the present embodiment where two outlets 108a, 108b are provided, the output of the water can be controlled to pass or not pass through the upper outlet 108a, lower outlet 108b, or both outlets 108a, 108b simultaneously.

The flow through the flow controller 112 to the outlets 108a, 108b can be changed according to a user input via a flow controller actuator in the form of a flow control knob 118 situated at the second end 106b of the housing 102.

As can be seen in FIGS. 1 and 2, the mixing chamber 114, temperature controller 110, and flow controller 112 are all disposed in a region of the housing 102 between the first end 106a and the outlets 108a, 108b, with the mixing chamber 114 adjacent to the first end 106a. As will be apparent, whilst the first end 106a has been described as that end at which the cold inlet 104b is situated, the first end 106a could instead be that at which the hot inlet 104a is situated, with the mixing chamber 114, temperature controller 110, and flow controller 112 all situated towards the other end of the housing 102 to that shown in the present embodiment.

By locating the mixing chamber 114, temperature controller 110, and flow controller 112 within the region of the housing 102 between the first end 106a and the outlets 108a, 108b, the flow of water from the mixing chamber 114 to the outlets 108a, 108b can be direct and unimpeded by any major changes to the direction of the flow. It can be seen that it is necessary for a 90° change of flow direction for the mixed flow to exit through the outlets 108a, 108b. In conventionally-designed bar valves, the flow direction must include a complete reversal of the water flow, a 180° change in flow direction, which results in substantial pressure losses, before a 90° change in flow direction at the outlet. Therefore, by confining the mixing chamber 114, temperature controller 110, and flow controller 112 within end region of the housing 102 between the first end 106a and the outlets 108a, 108b, a 180° change in flow direction is avoided and flow can be freer with lower pressure loss than is possible in a conventional bar valve.

Figure 3:
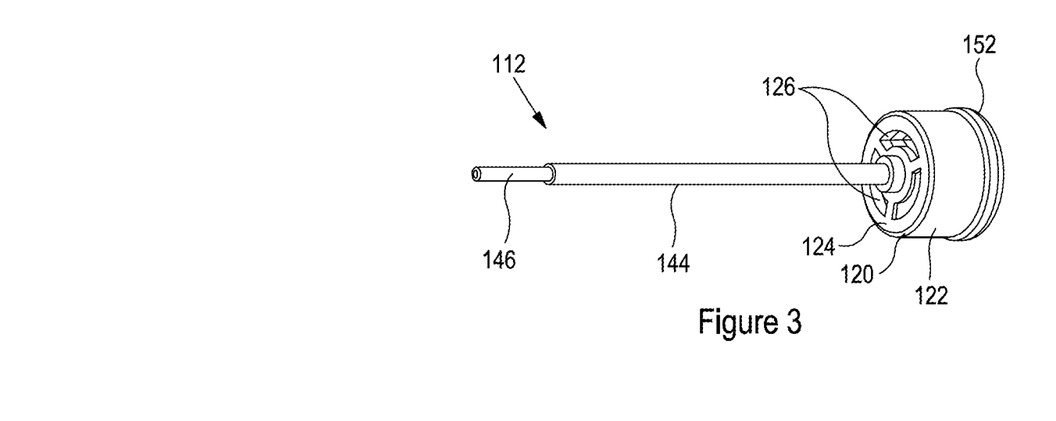
FIG. 3 is a perspective view of the flow controller of the bar valve of FIG. 1.
Figure 4:
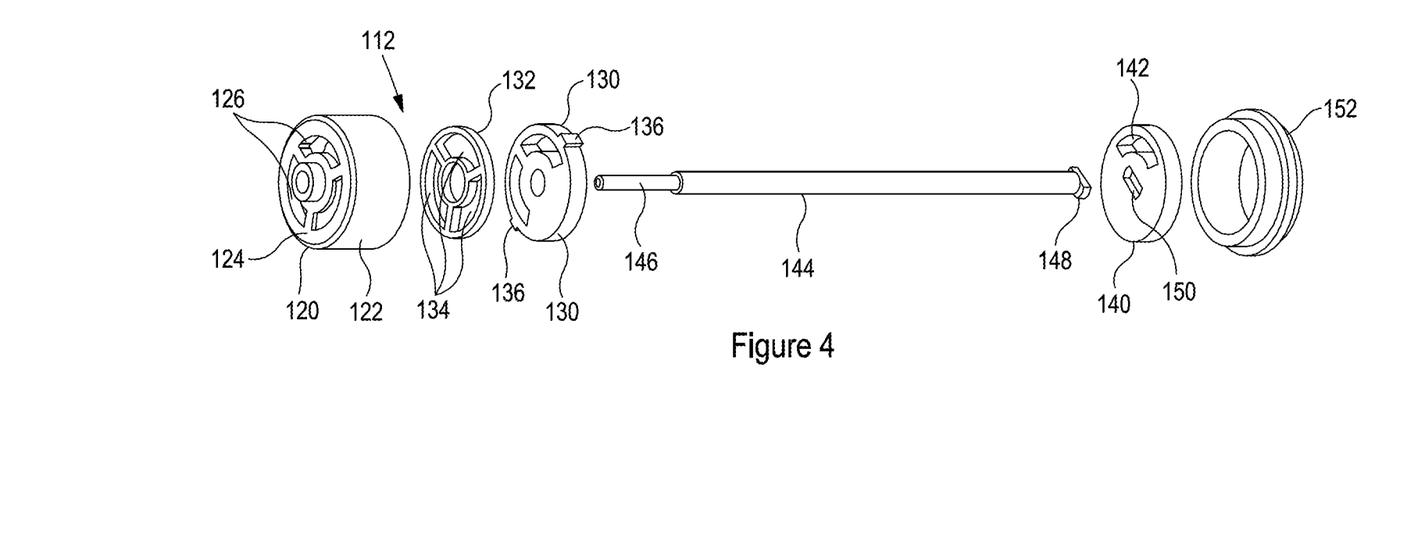
FIG. 4 is an exploded perspective view of the flow controller of FIG. 3.

As shown in FIGS. 3 and 4, the flow controller 112 of the present embodiment comprises a shell 120 having a tubular outer wall 122 and an end wall 124 at a distal end of the outer wall 122. The end wall 124 includes two shell apertures 126, each shell aperture 126 being aligned with a respective flow bore 128 of the housing 102. Each flow bore 128 therefore interconnects a shell aperture 126 of the flow controller 112 to a respective outlet 108a, 108b of the housing 102.

A fixed element 130 is located adjacent to the end wall 124 of the shell 120, the fixed element 130 being sealed to the end wall 124 by a profile seal 132 confined between the fixed element 130 and the end wall 124. The profile seal 132 and fixed element 130 each include apertures 134 that correspond to and align with the shell apertures 126 in the end wall 124 of the shell 120. The fixed element 130 includes small protrusions 136 that engage with corresponding indentations 138 in the outer wall 122 of the shell 120 to prevent rotation of the fixed element 130 relative to the shell 120. Although described as protrusions and indentations, other methods of preventing rotation of the fixed element 130 may be used including other non-permanent means such as engagement portions and physical fixtures, or permanent means such as adhesives.

Adjacent to the fixed element 130 is a rotatable element 140 including a single flow aperture 142. The rotatable element 140 is connected to a shaft 144, the rotation of which causes rotation of the rotatable element 140 within the shell 120. The shaft 144 can then be connected to the flow control knob 118 by an attachment section 146 located on the opposing end of the shaft 144 to that connected to the rotatable element 140, the attachment section 146 being engageable with a corresponding fastener (not shown) in the flow control knob 118. In the depicted embodiment, the fastener is a screw that screws into the end of the attachment section 146. The shaft 144 is connected by an engagement portion 148 with a substantially rectangular profile to a complementarily-shaped recess 150 within the rotatable element 140. The shaft 144 passes through the shell 120, profile seal 132, and fixed element 130 without engagement, whilst engaging with the rotatable element 140 in order to allow a user to adjust the rotatable element 140 by rotation of the flow control knob 118.

The fixed element 130 and rotatable element 140 of the present embodiment are each formed as discs of a ceramic material, that fit within the tube of the shell 120, in order to provide a low-friction and hard-wearing interaction between the fixed element 130 and rotatable element 140 during rotation of the rotatable element. Other suitable materials for achieving these characteristics may include low-friction polymers such as self-lubricating polymers, and will be known to the skilled person. A further benefit of using ceramic discs is that no lubricant is required, which ensures that the water flow remains untainted. A flow cap 152 is located adjacent to the rotatable element 140 and provides a seal between the rotatable element 140 and the shell 120, ensuring that water flowing into the flow controller 112 must pass through the shell 120 and cannot, therefore, bypass the flow controller 112.

The flow aperture 142 in the rotatable element 140 has an opening of approximately 120° in width. This can be selectively aligned with the two shell apertures 126 that also have openings of approximately 120° in width. As the shell apertures 126 align with the apertures 134 in the fixed element 130 and profile seal 132, alignment of the flow aperture 142 with the shell apertures 126 enables water to flow through the shell 120 and thus the flow controller 112. Each aperture may be larger or smaller depending on the total number of apertures required to direct water to the outlets 108a, 108b and whether or not there is a requirement to provide water flow to multiple outlets 108a, 108b simultaneously. Such possibilities and the resultant design considerations of the apertures will be apparent to the skilled person, in the context of the present disclosure.

Figure 6:
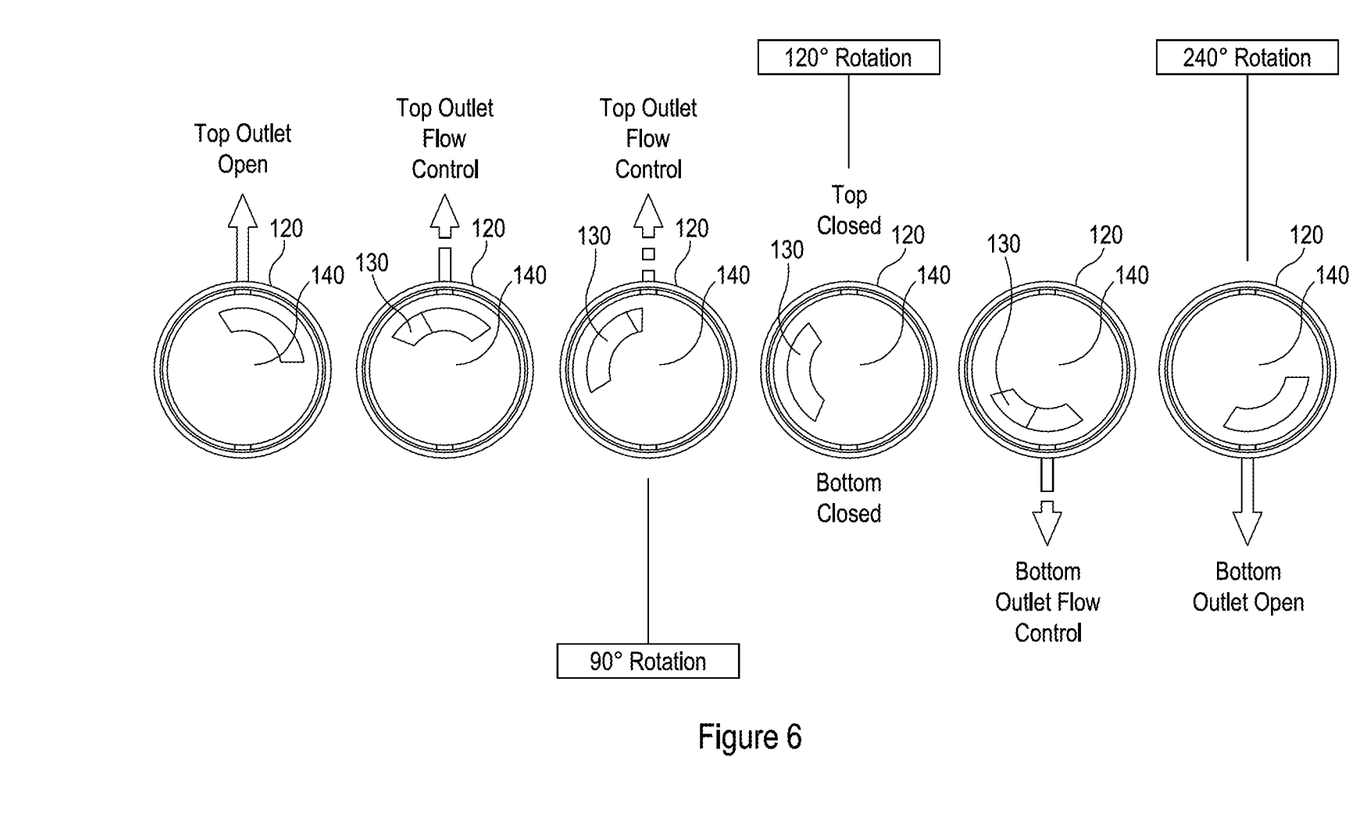
FIG. 6 depicts the flow controller of FIG. 3 in various positions.

As the rotatable element 140 is rotated, the flow aperture 142 will be aligned to a varying extent with the shell apertures 126 and flow through the shell apertures 126 and the flow bores 128 to the outlets 108a, 108b will be varied accordingly. FIG. 6 shows how the rotation of the rotatable element 140 affects the alignment of the flow aperture 142 with the shell apertures 126. The leftmost and rightmost images of FIG. 6 show the flow aperture 142 totally aligned with the shell aperture 126 leading to the upper outlet 108a and the shell aperture 126 leading to the lower outlet 108b, respectively. The intermediate positions show how the flow can be varied such that a partial misalignment with each of the shell apertures 126 causes a smaller total aperture area which results in a lower flow rate out of the outlets 108a, 108b. The flow can be cut off completely from both shell apertures 126 by complete misalignment of the flow aperture 142.

In addition, it will be possible to align the flow aperture 142 such that it aligns partially with both of the shell apertures 126 at once. Thus, flow can be provided simultaneously through both outlets 108a, 108b.

Figure 5:
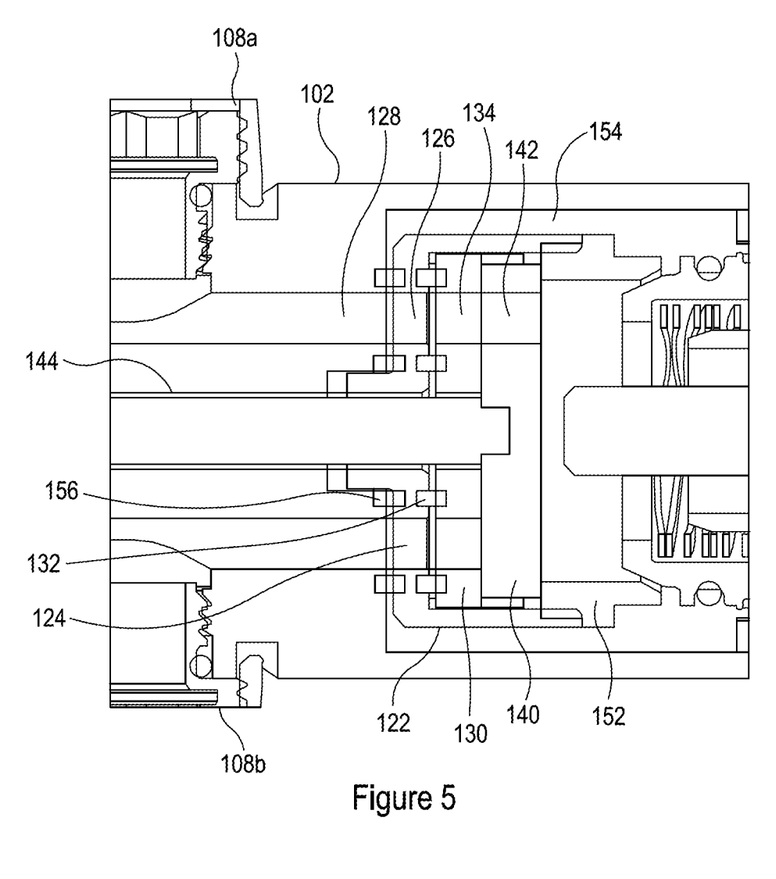
FIG. 5 is an enlarged view of the flow controller in situ within the flow controller of FIG. 1.

FIG. 5 shows the interaction of the flow controller 112 with the housing 102. A mounting element 154 is provided around the shell 120 of the flow controller 112, the mounting element 154 being interposed between the shell 120 and the housing 102. A seal 156 is provided that provides a seal between the housing 102 and the end wall 124 of the shell 120, whilst the flow cap 152 provides a seal between the shell 120, rotatable element 140, and the mounting element 154. Thus, water flow must pass through the flow controller 112 in order to flow from the mixing chamber 114 to the outlets 108a, 108b. The arrangement of FIG. 5 shows the flow aperture 142 of the rotatable element 140 aligned with the shell aperture 126 leading to the upper outlet 108a. The mounting element 154 is also visible in FIG. 1, though it has been omitted from FIG. 2, for clarity.

Figure 7:
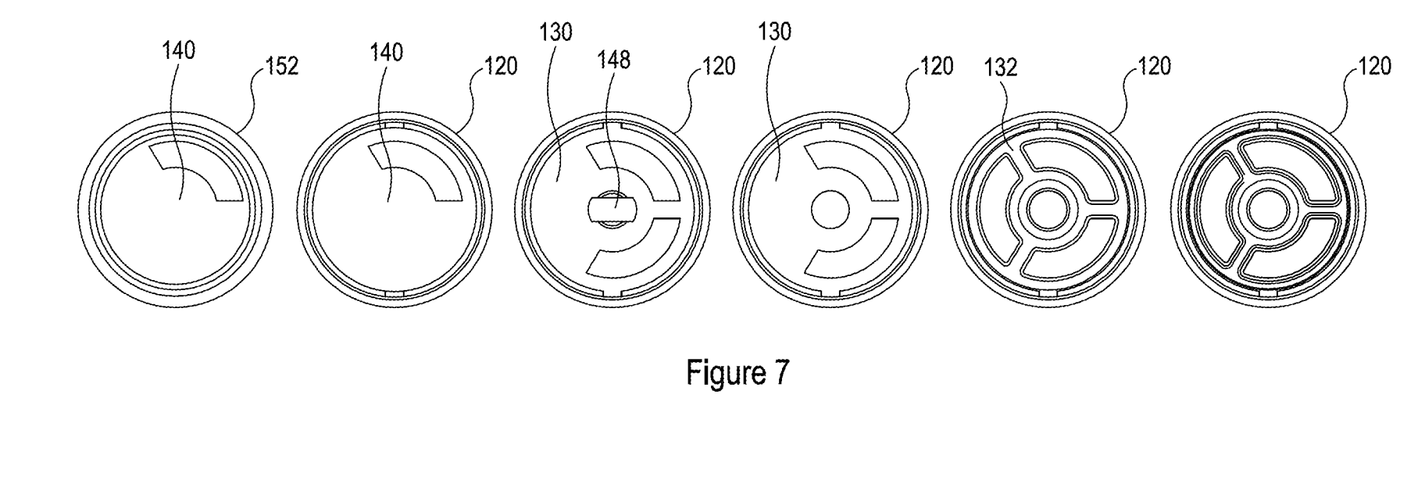
FIG. 7 depicts the interactions between parts of the flow controller of FIG. 3.

FIG. 7 shows the layering of parts within the flow controller 112, from an end-on view. From left to right, the components of the flow controller 112 are removed one by one, showing their respective positions and alignments. The rotatable element 140 is shown in total alignment with the shell aperture 126 of the upper outlet 108a.

Various modifications to the above-described example embodiments will be apparent to the person skilled in the art without departing from the scope of the concepts disclosed herein.

What is claimed is:

1. A bar valve comprising:
   an elongate housing having a first inlet located towards a first end of the housing, a second inlet located towards a second end of the housing, and an outlet located between the first inlet and the second inlet;
   a mixing chamber within the housing, the mixing chamber being configured to receive first and second input flows from the first inlet and second inlet, respectively; and
   a flow controller configured to receive a mixed flow from the mixing chamber and controllably output an outlet flow to the outlet;
   wherein the mixing chamber and flow controller are disposed sequentially in a region of the housing between the first end and the outlet, thereby confining the mixed flow and the outlet flow to the region of the housing between the first end and the outlet.

2. The bar valve according to claim 1, wherein the mixing chamber is located at or adjacent to the first end of the housing and the flow controller is located adjacent to the mixing chamber.

3. The bar valve according to claim 1, wherein the mixed flow entering the flow controller and the outlet flow exiting the flow controller are parallel to a longitudinal axis of the housing.

4. The bar valve according to claim 1, further comprising a temperature controller for varying the temperature of the mixed flow.

5. The bar valve according to claim 4, wherein the temperature controller at least one of:
   (a) varies a ratio of the first and second inlet flows to the mixing chamber, and
   (b) is thermostatic.

6. The bar valve according to claim 4, further comprising a temperature control actuator for controlling the temperature controller.

7. The bar valve according to claim 6, wherein the temperature control actuator at least one of:
   (a) includes a temperature control knob, handle, lever, or button, and
   (b) is located at the first end of the housing.

8. The bar valve according to claim 1, further comprising a flow controller actuator for controlling the flow controller.

9. The bar valve according to claim 8, wherein the flow controller actuator at least one of:
   (a) includes a flow control knob, handle, lever, or button, and
   (b) is located at the second end of the housing.

10. The bar valve according to claim 8, wherein the flow controller is rotatably mounted about a longitudinal axis of the housing.

11. The bar valve according to claim 1, wherein the flow controller comprises a shell including at least one shell aperture and a rotatable element including at least one flow aperture, the rotatable element being actuatable by a user to selectively align the flow aperture with the shell aperture, selectively allowing flow through the flow controller.

12. The bar valve according to claim 11, wherein the flow controller further includes a shaft, the shaft being rotatable to cause rotation of the rotatable element.

13. The bar valve according to claim 12, wherein the shaft is configured to be rotated by a flow controller actuator.

14. The bar valve according to claim 11, wherein the flow controller further comprises a fixed element, the rotatable element configured to bear against the fixed element during rotation.

15. The bar valve according to claim 14, wherein the flow controller further comprises a seal element interposed between the fixed element and the shell.

16. The bar valve according to claim 15, wherein the flow controller further comprises a flow cap for sealing together the rotatable element and the shell.

17. The bar valve according to claim 16, wherein the flow cap, rotatable element, fixed element, seal element, and shell are arranged sequentially in a direction of flow through the flow controller.

18. The bar valve according to claim 1, further comprising at least one additional outlet through which the flow controller can direct flow.

19. A bar valve comprising:
- an elongate housing having a first inlet located towards a first end of the housing, a second inlet located towards a second end of the housing, and an outlet located between the first inlet and the second inlet, wherein the outlet defines a first section from the first end of the housing to the outlet and a second section from the second end of the housing to the outlet;
- a mixing chamber within the housing, the mixing chamber being configured to receive first and second input flows from the first inlet and second inlet, respectively; and
- a flow controller configured to receive a mixed flow from the mixing chamber and controllably output an outlet flow to the outlet;
- wherein the mixing chamber and flow controller are disposed sequentially in one of the first section or the second section, thereby confining the mixed flow and the outlet flow to the first section or the second section.

* * * * *